United States Patent
Poirier

(10) Patent No.: US 10,429,117 B2
(45) Date of Patent: Oct. 1, 2019

(54) MODULARLY-WHEELED COOLER

(71) Applicant: David Poirier, Houston, TX (US)

(72) Inventor: David Poirier, Houston, TX (US)

(*) Notice: Subject to any disclaimer, the term of this patent is extended or adjusted under 35 U.S.C. 154(b) by 0 days.

(21) Appl. No.: 16/107,918

(22) Filed: Aug. 21, 2018

(65) Prior Publication Data

US 2019/0226742 A1    Jul. 25, 2019

Related U.S. Application Data

(60) Provisional application No. 62/620,003, filed on Jan. 22, 2018.

(51) Int. Cl.
| | |
|---|---|
| *B62B 3/08* | (2006.01) |
| *F25D 3/08* | (2006.01) |
| *B62B 1/12* | (2006.01) |

(52) U.S. Cl.
CPC .............. *F25D 3/08* (2013.01); *B62B 1/125* (2013.01); *B60B 2340/50* (2013.01); *B62B 2204/06* (2013.01); *F25D 2331/804* (2013.01); *F25D 2400/38* (2013.01)

(58) Field of Classification Search
CPC ..................................................... B62B 3/04
See application file for complete search history.

(56) References Cited

U.S. PATENT DOCUMENTS

| | | | | |
|---|---|---|---|---|
| 5,876,047 | A * | 3/1999 | Dennis .................... | B62B 3/007 280/47.35 |
| 7,309,106 | B2 * | 12/2007 | Stallman .............. | A47C 15/004 297/188.09 |
| 9,211,902 | B2 * | 12/2015 | Vanderberg ........... | B62B 5/0083 |
| 9,415,787 | B2 * | 8/2016 | Mericle ..................... | B62B 3/02 |
| 2001/0054433 | A1 * | 12/2001 | Patarra ..................... | A45B 3/00 135/16 |
| 2003/0168371 | A1 * | 9/2003 | Weimer .................. | A45C 11/20 206/457 |
| 2008/0001373 | A1 * | 1/2008 | Vaughn .................. | A45C 5/146 280/47.26 |
| 2017/0370629 | A1 * | 12/2017 | Fire ....................... | B67D 1/0084 |

* cited by examiner

*Primary Examiner* — James A Shriver, II
*Assistant Examiner* — James J Triggs

(57) ABSTRACT

A modularly-wheeled cooler that that can be transported across almost any surface and can store wheels and other objects when not in use. The modularly-wheeled includes a receptacle, a lid, a pair of front axles, a pair of rear axles, a plurality of wheel-attachment features, and a first plurality of peg-attachment features. The receptacle is preferably a structural body that can receive and store objects. The lid provides a cover means that conceals and protects the objects stored inside of the receptacle. The pair of front axles and the pair of rear axles allow the cooler have wheels attached. The plurality of wheel-attachment features allows the cooler to receive and store wheels when the cooler is not in use. The plurality of peg-attachment features allows the cooler to have storage pegs attached which allow the cooler to store objects such as foldable chairs.

18 Claims, 9 Drawing Sheets

MODULARLY-WHEELED COOLER

The current application claims a priority to the U.S. Provisional Patent application Ser. No. 62/620,003 filed on Jan. 22, 2018.

FIELD OF THE INVENTION

The present invention relates generally to coolers, wheeled coolers, transportable coolers, and ice chests. More specifically, the present invention is a modularly-wheeled cooler that includes pneumatic tires which allow the cooler to move across almost any surface and can be stored inside the cooler, storage pegs that can be easily removed and stored inside the cooler, and a retractable handle that allows a user to easily transport the cooler.

BACKGROUND OF THE INVENTION

The wheeled cooler has been around for a number of years, but still does not meet the expectations of recreational users because of its poor design. For example, the two solid wheeled model that is available on the market now works fairly well on concrete surfaces as long as the person pulling the cooler isn't too tall. The problem lies with once it is off the concrete surface, it is completely useless in sand or dirt, or over rough terrain. Also, if a tall person is pulling it, all the items inside "shift" to the back of the cooler and can crush the fragile items that are stored within. Also, the coolers on the market today do not have built in storage capacity on the top of the cooler. If there are ancillary items to be transported, there is no way to secure them properly on the current cooler models. If a tall or shorter person is transporting the cooler, the handle should be adjustable to meet their height requirements.

It is therefor an objective of the present invention to provide modularly-wheeled cooler that includes pneumatic tires which allow the cooler to move across almost any surface and can be stored inside the cooler, storage pegs that can be easily removed and stored inside the cooler, and a retractable handle that allows a user to easily transport the cooler.

DETAIL DESCRIPTIONS OF THE INVENTION

Figure 1:
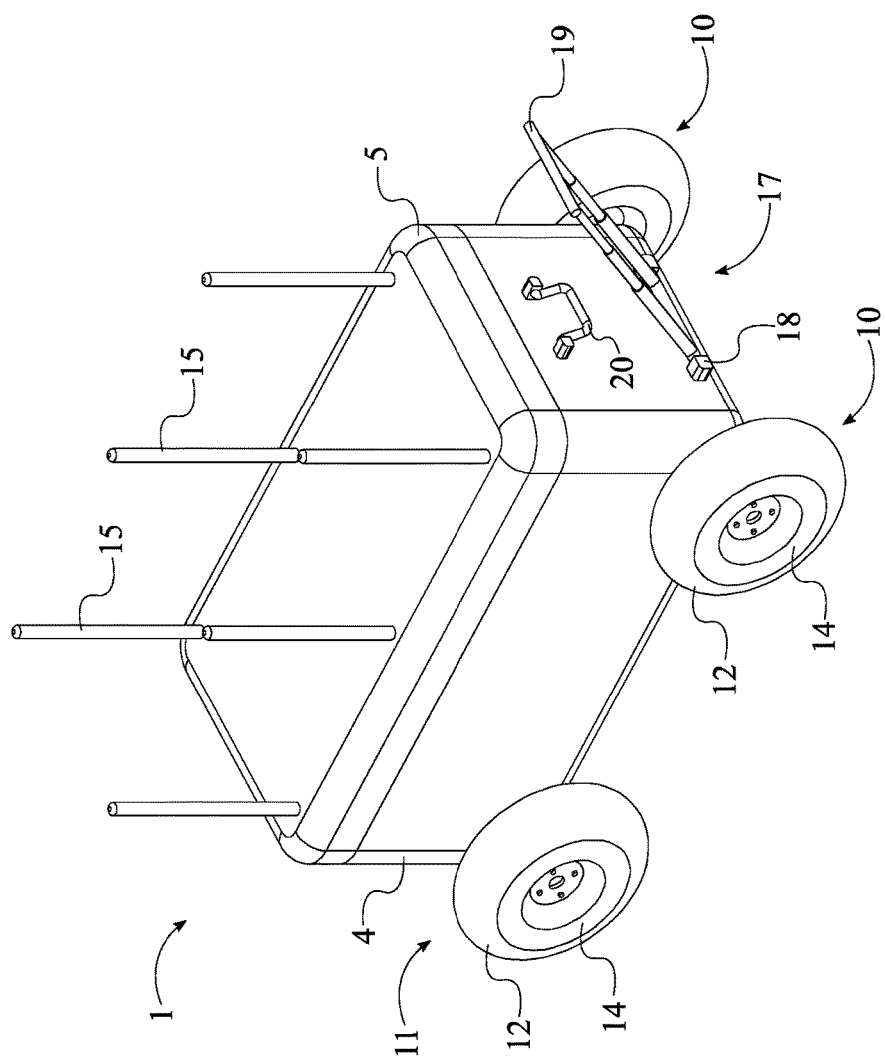
FIG. 1 is a front perspective view of the present invention.

All illustrations of the drawings are for the purpose of describing selected versions of the present invention and are not intended to limit the scope of the present invention.

The present invention is a modularly-wheeled cooler that can be transported across almost any surface and can store wheels and other objects when not in use. In reference to FIGS. 1 and 2, the present invention comprises a receptacle 1, a lid 5, a front axle 6, a rear axle 7, a plurality of wheel-attachment features 8, and a first plurality of peg-attachment features 9. The receptacle 1 is preferably a structural body that can receive and store objects. The lid 5 provides a cover that conceals and protects the objects stored inside of the receptacle 1. The front axle 6 and the rear axle 7 allow the present invention to mount wheels. The plurality of wheel-attachment features 8 allows the present invention to receive and store wheels when the present invention is not in use. The plurality of peg-attachment features allows the present invention to attach storage pegs which allow the present invention to store objects such as, but not limited to, foldable chairs or tents.

Figure 3:
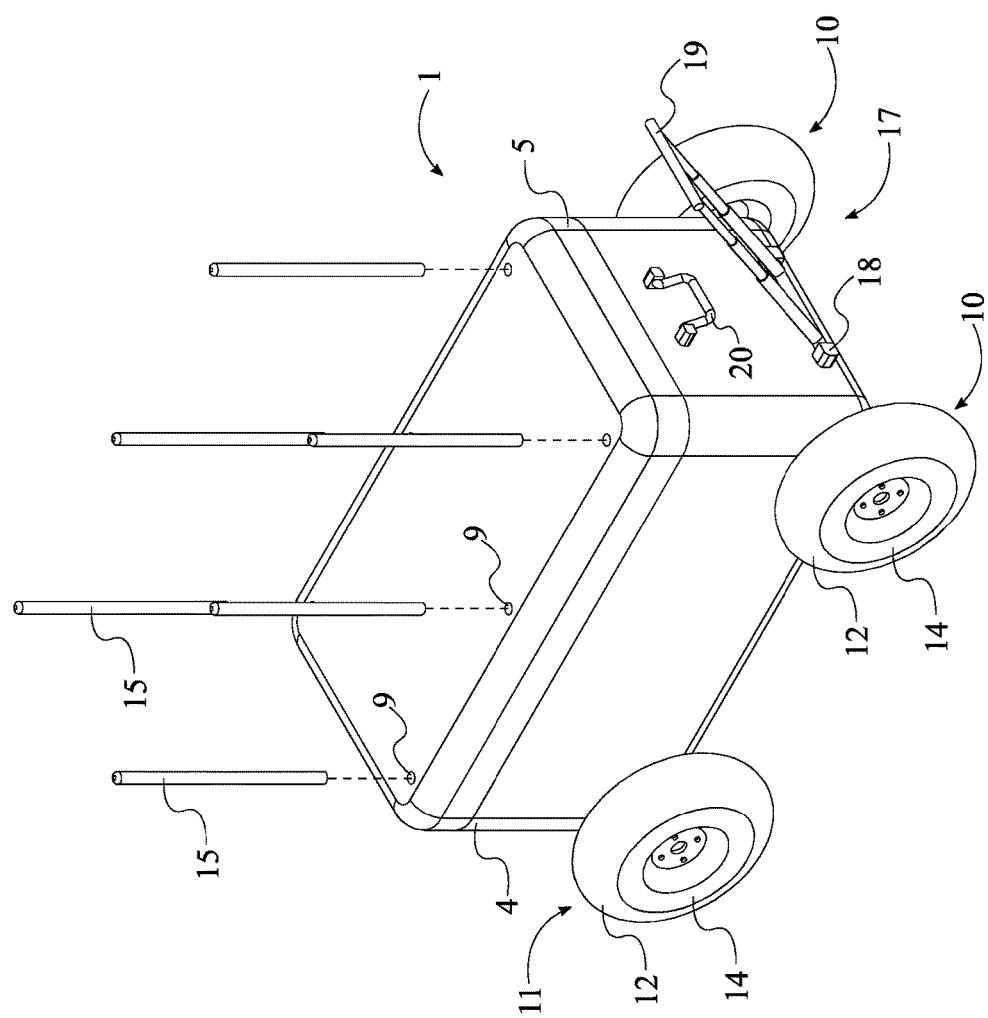
FIG. 3 is a front perspective view of the present invention without the plurality of storage pegs.
Figure 6:
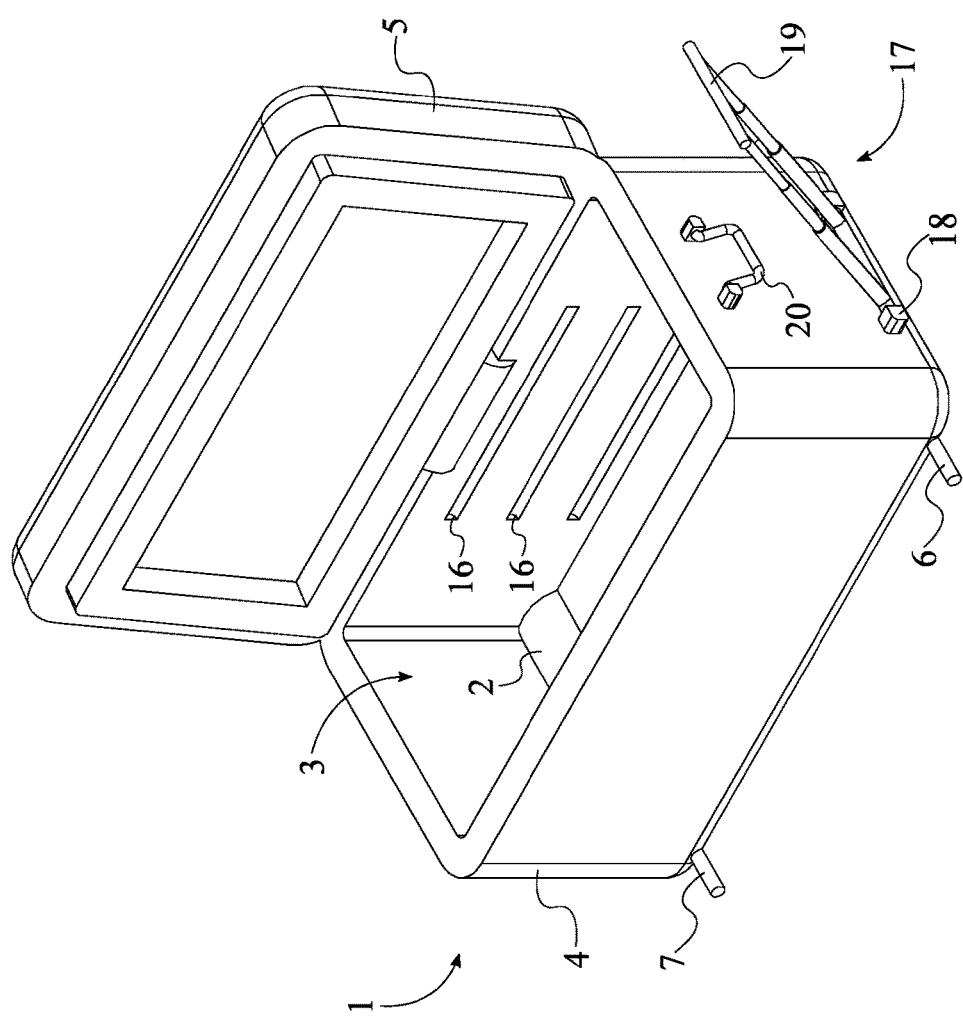
FIG. 6 is a front perspective view of the present invention displaying the inside of the receptacle.

The general configuration of the aforementioned components allows the present invention to be transported across almost any surface and store wheels and other objects when not in use. With reference to FIGS. 3 and 6, the receptacle 1 comprises a bottom base 2, an opening 3, and a lateral wall 4 that define a standard cooler-container shape. The plurality of wheel-attachment features 8 is positioned within the receptacle 1 and integrated into the bottom base 2. This arrangement conceals the wheels when the present invention is not in use. The lid 5 is mounted onto the lateral wall 4, adjacent to the opening 3. This arrangement allows the lid 5 to conceal what is placed inside of the receptacle 1. Furthermore, the lid 5 is hingedly connected to the receptacle 1. This arrangement allows the user to open or close the lid 5 without fully removing the lid 5 from the receptacle 1. The front axle 6, the rear axle 7, and the plurality of peg-attachment features are positioned external to the receptacle 1 and the lid 5. The front axle 6 and the rear axle 7 are externally mounted to the bottom base 2 and positioned offset from each other across the bottom base 2. This arrangement allows the wheels to be properly positioned to the receptacle 1 by the front axle 6 and the rear axle 7. The first plurality of peg-attachment features 9 is integrated into the lid 5. In more detail, the first plurality of peg-attachment features 9 is preferably molded into the lid 5. This arrangement allows storage pegs to be properly positioned in order to store objects such as, but not limited to, folding chairs or tents.

Figure 4:
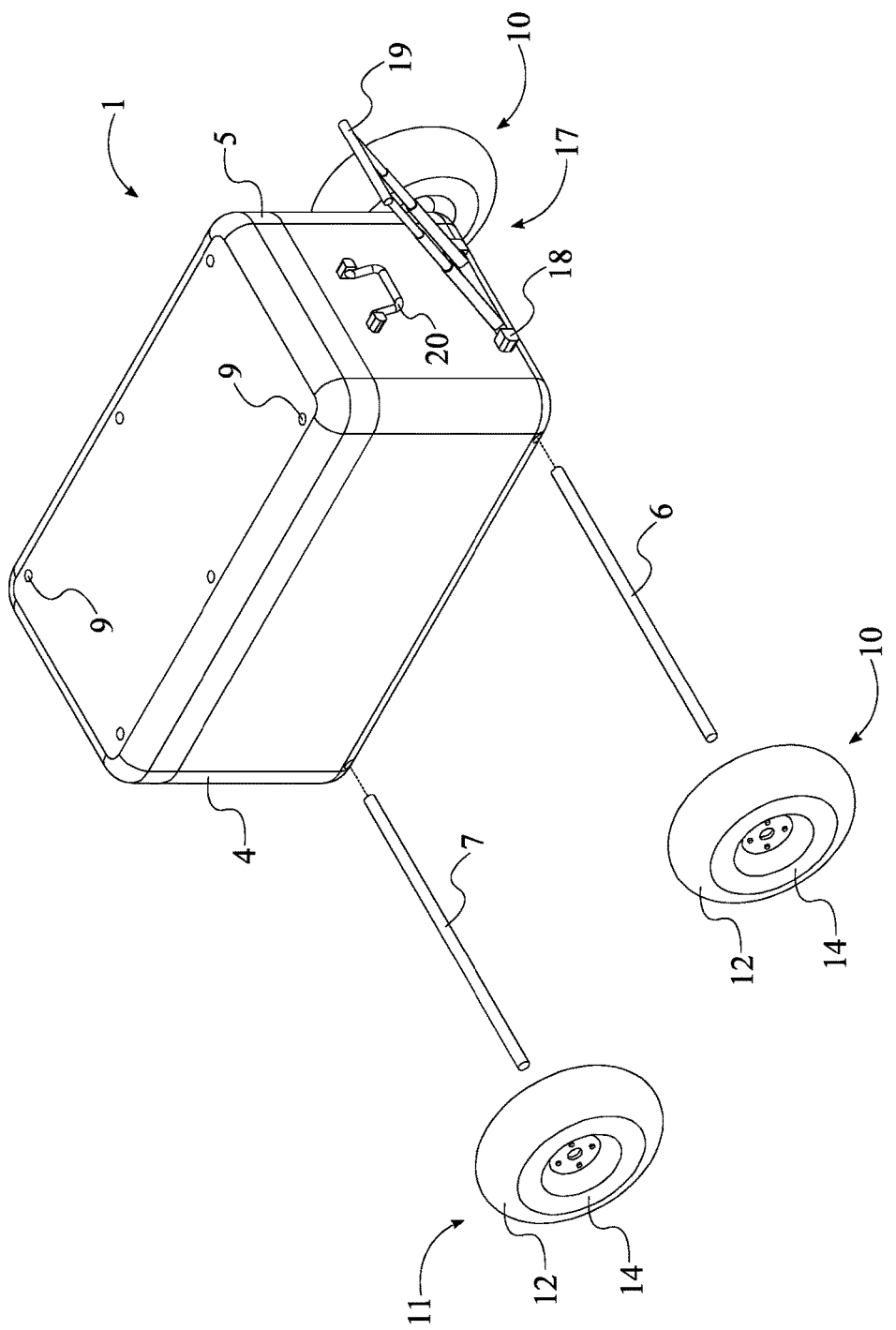
FIG. 4 is an exploded front perspective view of the present invention displaying the front axle and the rear axle.
Figure 5:
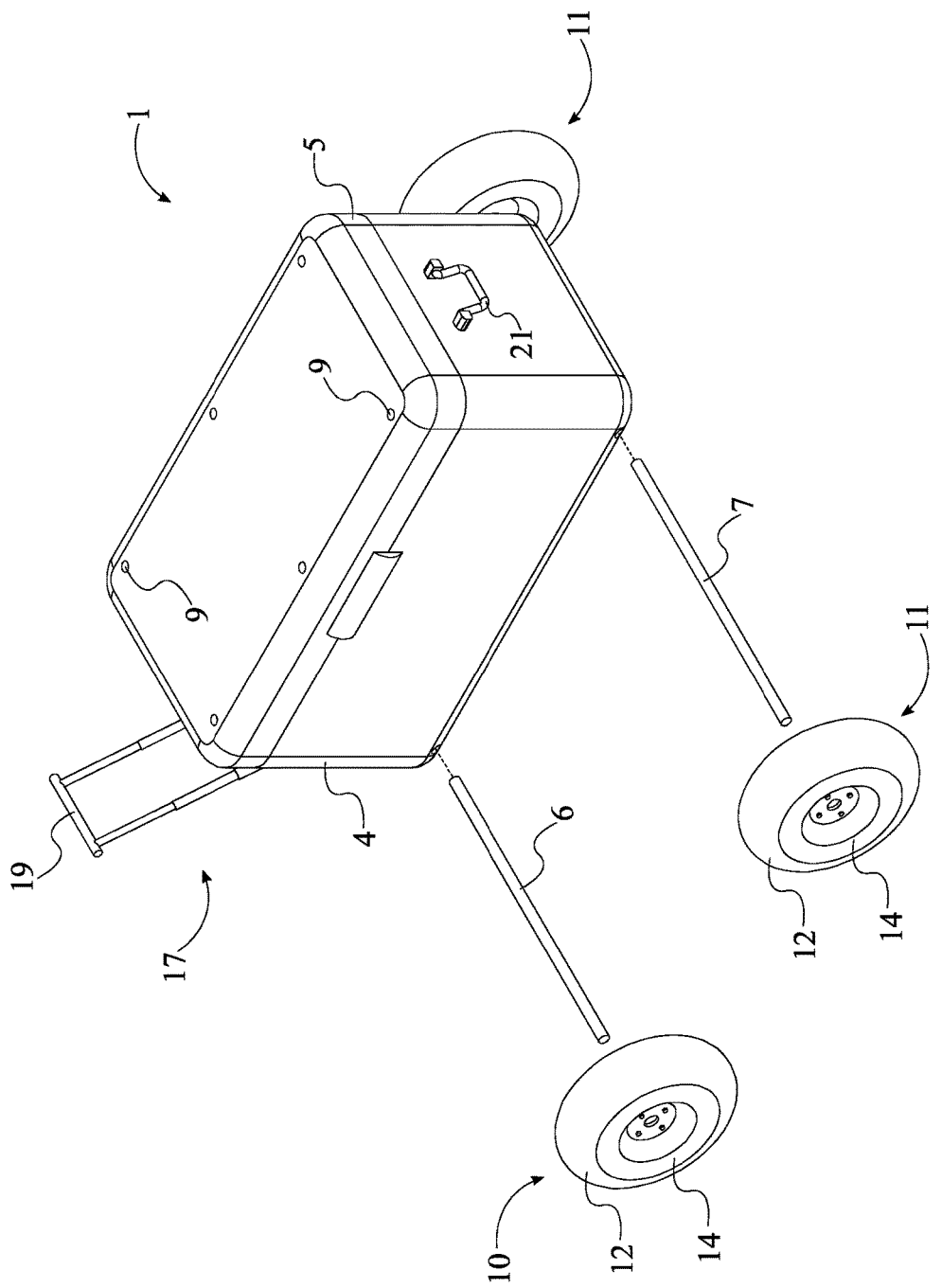
FIG. 5 is an exploded rear perspective view of the present invention displaying the front axle and the rear axle.

In reference to FIGS. 4 and 5, the present invention further comprises a pair of front wheels 10 and a pair of rear wheels 11. The pair of front wheels 10 and the pair of rear wheels 11 allow the present invention to be translated across almost any surface. When the present invention is moved across any surface, each wheel from the pair of the front wheels 10 is rotatably mounted to the front axle 6 and positioned offset to each other, across the front axle 6. In more detail, each wheel from the pair of the front wheels 10 is rotatably mounted to front axle 6 by a linchpin. In addition, the present invention may include a spacer that prevents each wheel from the pair of front wheels 10 from rubbing on the receptacle 1. This arrangement allows the pair of front wheels 10 to be rotated about the front axle 6 in order for the present invention to translate across a surface. Similarly, each wheel from the pair of the rear wheels is rotatably mounted to the rear axle 7 and positioned offset to each other, across the rear axle 7. In more detail, each wheel from the pair of the rear wheels 11 is rotatably mounted to rear axle 7 by a linchpin. In addition, the present invention may include a spacer that prevents each wheel from the pair of rear wheels 11 from rubbing on the receptacle 1. This arrangement allows the pair of rear wheels 11 to be rotated about the rear axle 7 in order for the present invention to translate across a surface. In reference to FIG. 8 and when the present invention is not being moved across a surface, the pair of front wheels 10 and the pair of rear wheels 11 are positioned within the receptacle 1. More specifically, the pair of front wheels 10 and the pair of rear wheels 11 are attached to the bottom base 2 by the plurality of wheel-attachment features 8. This arrangement allows the pair of front wheels 10 and the pair of rear wheels 11 to be stored and secured within the receptacle 1 when the present invention is not in use.

The pair of front wheels 10 and the pair of rear wheels 11 are preferably pneumatic wheels and therefore each of the pair of front wheels 10 and each of the pair of rear wheels 11 each comprise an inflated tire 12 and a rim 14. The present invention is able to move across any surface because the pair of front wheels 10 and the pair of rear wheels 11 are preferably pneumatic. The inflated tire 12 is laterally mounted around the rim 14 in order for the rim 14 to protect the inner tubing of the inflated tire 12. The pair of front wheels 10 and the pair of rear wheels 11 can be freely inflated or deflated by the user when desired.

Figure 7:
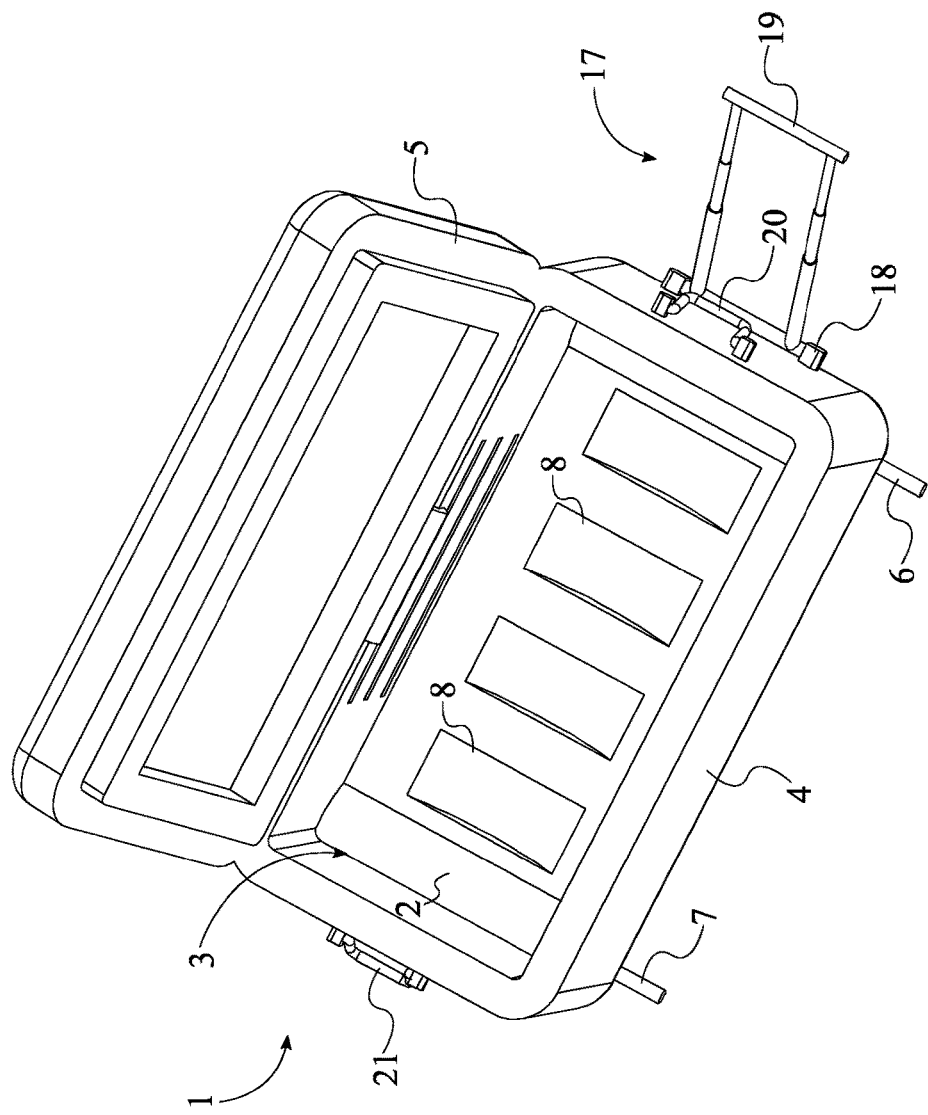
FIG. 7 is top perspective view of the present invention displaying the inside of the receptacle.

In order for the pair of front wheels 10 and the pair of rear wheels 11 to be secured to the bottom base 2 and with reference to FIG. 7, the plurality of wheel-attachment features 8 of the present invention is preferably a plurality of wheel-gripping indentations. The plurality of wheel-gripping indentations traverses into the bottom base 2. The plurality of wheel-gripping indentations is positioned offset from each other. In more detail, the plurality of wheel-gripping indentations is preferably molded into the bottom base 2. This arrangement allows the plurality of wheel-gripping indentations to efficiently hold the pair of front wheels 10 and the pair of rear wheels 11 inside the receptacle 1. Furthermore, the plurality of wheel-attachment features 8 is centrally positioned on to the bottom base 2. This arrangement provides enough area for plurality of wheel-attachment features 8 to proficiently hold the pair of front wheels 10 and the pair of rear wheels 11 in place. In another embodiment of the present invention, the plurality of wheel-attachment features 8 may be any type of method to secure the pair of front wheels 10 and the pair of rear wheels 11 to the bottom base 2. For example, the plurality of wheel-attachment features 8 may be a plurality of clamping devices, a plurality of wheel fasteners, or any type of securement device which can secure the pair of front wheels 10 and the pair of rear wheels 11 to the bottom base 2.

Figure 2:
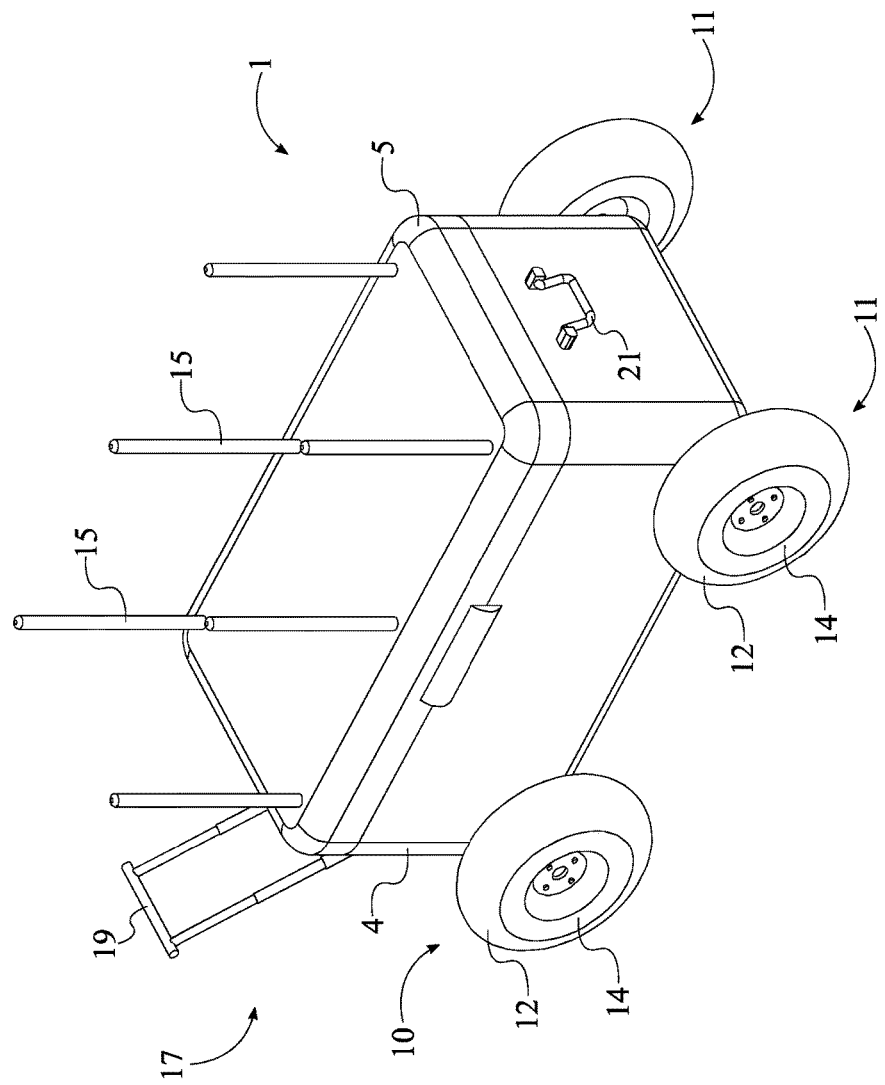
FIG. 2 is a rear perspective view of the present invention.

With reference to FIGS. 1 through 3, the present invention may further comprise a plurality of storage pegs 15. The plurality of storage pegs 15 allows the user to store objects such as, but not limited to, folding chairs or a tent on the present invention. The plurality of storage pegs 15 is preferably made of thin, rigid material such as, but not limited to, metal or plastic. The plurality of storage pegs 15 is positioned normal to the lid 5. Each of the plurality of storage pegs 15 is engaged to a corresponding feature from the first plurality of peg-attachment features 9. This arrangement provides at least one area, bordered by the plurality of storage pegs 15, that can hold objects such as folding chairs or tents.

Figure 8:
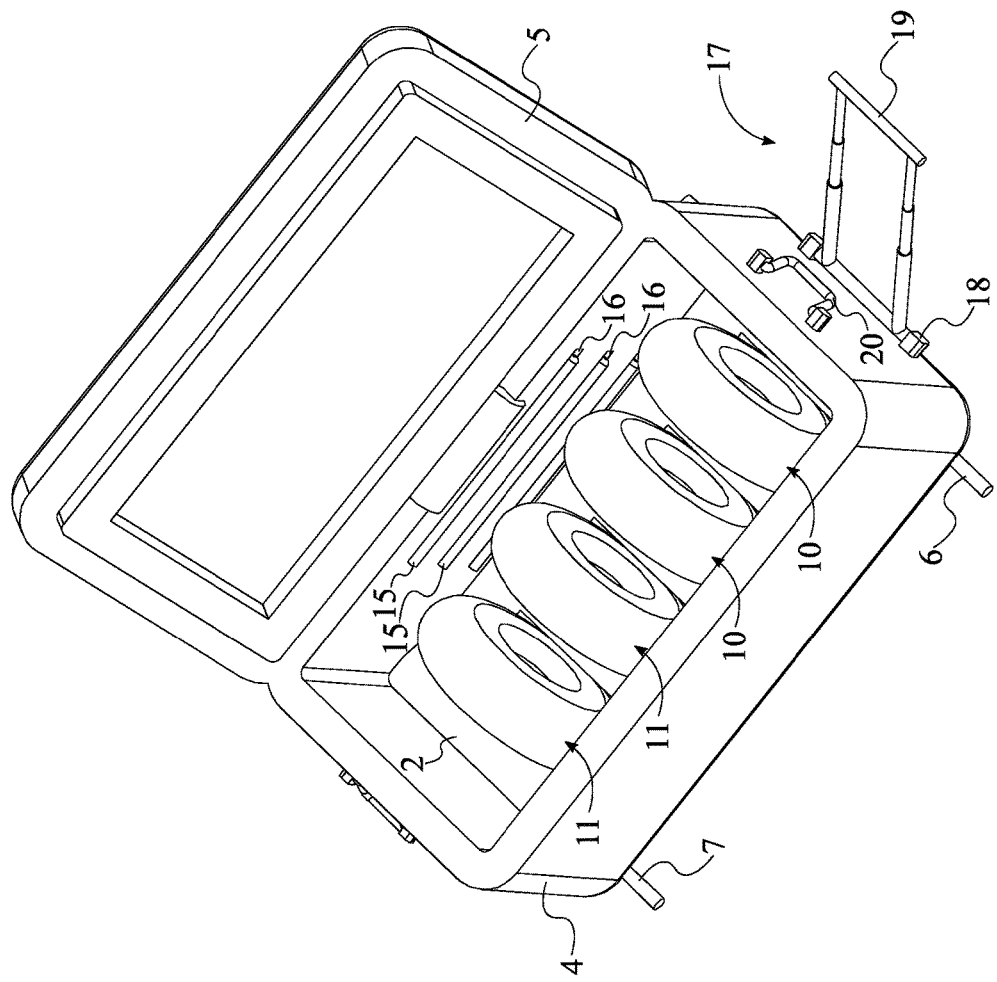
FIG. 8 is a top perspective view of the present invention displaying the pair of front wheels, the pair of rear wheels, and the plurality of storage pegs inside of the receptacle.
Figure 9:
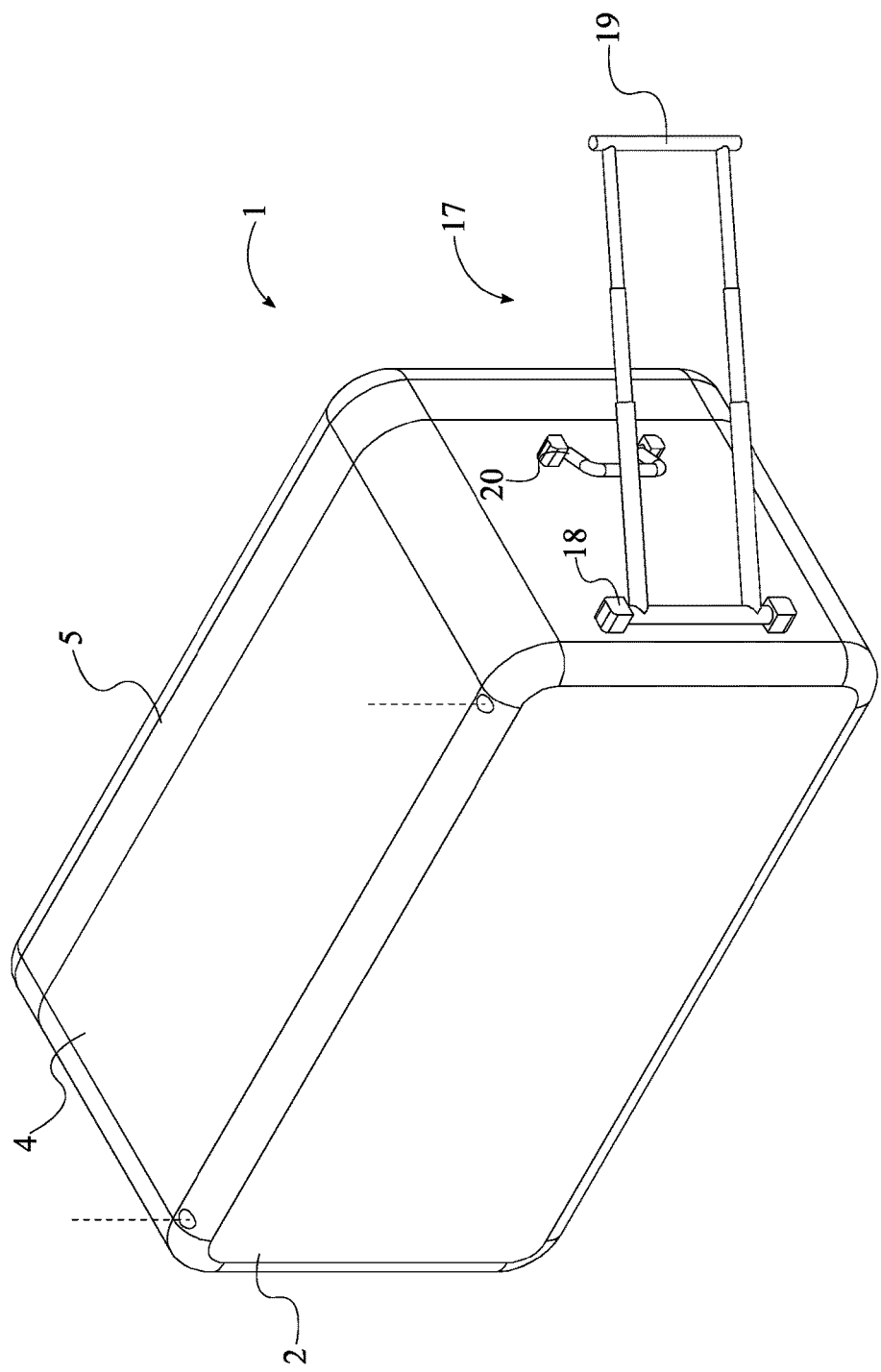
FIG. 9 is a bottom perspective review of the present invention.

With reference to FIGS. 7 and 8, the present invention may further comprise a second plurality of peg-attachment features 16. The second plurality of peg-attachment features 16 allows the user to store the plurality of storage pegs 15 when not in use. The second plurality of peg-attachment features 16 is positioned within the receptacle 1. The second plurality of peg-attachment features 16 is integrated into and distributed across the lateral wall 4. Each of the plurality of storage pegs 15 is engaged to a corresponding feature from the second plurality of peg-attachment features 16. This arrangement allows the plurality of storage pegs 15 to be properly secured to the lateral wall 4. Each of the second plurality of peg-attachment features 16 is preferably molded into the lateral wall 4 to receive a corresponding storage peg. This arrangement doesn't cut into the storage volume of the receptacle 1 while still allowing the user to storage the plurality of storage pegs 15. In another embodiment of the present invention, the second plurality of peg-attachment features 16 may be any type of fastening device, such as, but not limited to, a snap fit fastener or another type of fastener that allows the plurality of storage pegs 15 to be secured to the lateral wall 4.

With reference to FIG. 1, the present invention may further comprise a telescopic handle 17. The telescopic handle 17 is a gripping element which allows users of varying heights to haul the present invention across a surface. The telescopic handle 17 comprises a fixed end 18 and grasping end 19. The fixed end 18 is positioned externally to the receptacle 1 and mounted onto the lateral way. This arrangement allows the user to extend the telescopic handle 17 by the grasping end 19 without removing the telescopic handle 17 from the receptacle 1. Furthermore, the fixed end 18 is hingedly connected onto the lateral wall 4 which allows the user to haul the present invention parallel to the ground surface while maintaining an angular positioning for the telescopic handle 17 and for the telescopic handle 17 to be positioned adjacent to the receptacle 1 when the present invention is not in use. Furthermore, this arrangement prevents any accidentally bumping into the telescopic handle 17 when positioned adjacent to the receptacle 1.

With reference to FIGS. 1 and 2, the present invention comprises a first side handle 20 and a second side handle 21. The first side handle 20 and the second side handle 1 provide additional gripping elements which allow a user to lift up the present invention from a surface. The first side handle 20 and the second side handle 21 are positioned external to the receptacle 1 and mounted onto the lateral wall 4. The first side handle 20 and the second side handle 21 are positioned opposite to each other about the lateral wall 4. This arrangement allows the user to easily access the first side handle 20 and the second side handle 21 as leverage points to lift up the present invention.

Although the invention has been explained in relation to its preferred embodiment, it is to be understood that many other possible modifications and variations can be made without departing from the spirit and scope of the invention as hereinafter claimed.

What is claimed is:

1. A modularly-wheeled cooler comprising:
a receptacle;
a lid;
a front axle;
a rear axle;
a plurality of wheel-attachment features;
a first plurality of peg-attachment features;
the receptacle comprising a bottom base, an opening and a lateral wall;
the plurality of wheel-attachment features being positioned within the receptacle;
the plurality of wheel-attachment features being integrated into the bottom base;

the lid being mounted onto the lateral wall adjacent to the opening;

the front axle, the rear axle, and the plurality of peg-attachment features being positioned external to the receptacle and the lid;

the front axle and the rear axle being externally mounted to the bottom base;

the front axle and the rear axle being positioned offset from each other across the bottom base;

the first plurality of peg-attachment features being integrated into the lid;

the plurality of wheel-attachment features being a plurality of wheel-gripping indentations;

the plurality of wheel-gripping indentations traversing into the bottom base;

the plurality of wheel-gripping indentations being positioned offset from each other;

the bottom base comprising an upper surface;

the upper surface being oriented towards to the opening;

the plurality of wheel-gripping indentations being formed on the upper surface;

a pair of front wheels;

a pair of rear wheels;

the plurality of wheel-gripping indentations being configured to store the pair of front wheels and the pair of rear wheels; and the pair of front wheels and the pair of rear wheels each being a pneumatic wheel.

2. The modularly-wheeled cooler as claimed in claim 1 comprising:

each wheel from the pair of the front wheels being rotatably mounted to the front axle;

the pair of front wheels being positioned offset to each other, across the front axle;

each wheel from the pair of the rear wheels being rotatably mounted to the rear axle; and the pair of rear wheels being positioned offset to each other, across the rear axle.

3. The modularly-wheeled cooler as claimed in claim 2 comprising:

each of the pair of front wheels and each of the pair of rear wheels each comprising an inflated tire and a rim; and the inflated tire being laterally mounted around the rim.

4. The modularly-wheeled cooler as claimed in claim 1 comprising:

the pair of front wheels and the pair of rear wheels being positioned within the receptacle; and the pair of front wheels and the pair of rear wheels being attached to the bottom base by the plurality of wheel-attachment features.

5. The modularly-wheeled cooler as claimed in claim 1 comprising:

the plurality of wheel-attachment features being centrally positioned onto the bottom base.

6. The modularly-wheeled cooler as claimed in claim 1 comprising:

a plurality of storage pegs;

the plurality of storage pegs being positioned normal to the lid; and each of the plurality of storage pegs being engaged to a corresponding feature from the first plurality of peg-attachment features.

7. The modularly-wheeled cooler as claimed in claim 1 comprising:

a plurality of storage pegs;

a second plurality of peg-attachment features;

the second plurality of peg-attachment features and the plurality of storage pegs being positioned within the receptacle;

the second plurality of peg-attachment features being integrated into the lateral wall;

the second plurality of peg-attachment features being distributed across the lateral wall; and each of the plurality of storage pegs being engaged to a corresponding feature from the second plurality of peg-attachment features.

8. The modularly-wheeled cooler as claimed in claim 1 comprising:

a telescopic handle;

the telescopic handle comprising a fixed end and a grasping end;

the fixed end being positioned external to the receptacle; and the fixed end being mounted onto the lateral wall.

9. The modularly-wheeled cooler as claimed in claim 8 comprising:

the fixed end being hingedly connected onto the lateral wall.

10. The modularly-wheeled cooler as claimed in claim 1 comprising:

a first side handle;

a second side handle;

the first side handle and the second side handle being positioned external to the receptacle;

the first side handle and the second side handle being mounted onto the lateral wall; and the first side handle and the second side handle being positioned opposite to each other about the lateral wall.

11. The modularly-wheeled cooler as claimed in claim 1 comprising:

the lid being hingedly connected to the receptacle.

12. A modularly-wheeled cooler comprising:

a receptacle;

a lid;

a front axle;

a rear axle;

a plurality of wheel-attachment features;

a first plurality of peg-attachment features;

a plurality of storage pegs;

the receptacle comprising a bottom base, an opening and a lateral wall;

the plurality of wheel-attachment features being positioned within the receptacle;

the plurality of wheel-attachment features being integrated into the bottom base;

the lid being mounted onto the lateral wall adjacent to the opening;

the front axle, the rear axle and the plurality of peg-attachment features being positioned external to the receptacle and the lid;

the front axle and the rear axle being externally mounted to the bottom base;

the front axle and the rear axle being positioned offset from each other across the bottom base;

the first plurality of peg-attachment features being integrated into the lid;

the plurality of storage pegs being positioned normal to the lid; and each of the plurality of storage pegs being engaged to a corresponding feature from the first plurality of peg-attachment features;

the plurality of wheel-attachment features being a plurality of wheel-gripping indentations;

the plurality of wheel-gripping indentations traversing into the bottom base;

the plurality of wheel-gripping indentations being positioned offset from each other;

the plurality of wheel-attachment features being centrally positioned onto the bottom base;

the bottom base comprising an upper surface;

the upper surface being oriented towards to the opening;

the plurality of wheel-gripping indentations being formed on the upper surface;

a pair of front wheels;

a pair of rear wheels;

the plurality of wheel-gripping indentations being configured to store the pair of front wheels and the pair of rear wheels; and the pair of front wheels and the pair of rear wheels each being a pneumatic wheel.

13. The modularly-wheeled cooler as claimed in claim 12 comprising:

each wheel from the pair of the front wheels being rotatably mounted to the front axle;

the pair of front wheels being positioned offset to each other, across the front axle;

each wheel from the pair of the rear wheels being rotatably mounted to the rear axle;

the pair of rear wheels being positioned offset to each other, across the rear axle;

each of the pair of front wheels and each of the pair of rear wheels each comprising an inflated tire and a rim; and the inflated tire being laterally mounted around the rim.

14. The modularly-wheeled cooler as claimed in claim 12 comprising:

the pair of front wheels and the pair of rear wheels being positioned within the receptacle; and the pair of front wheels and the pair of rear wheels being attached to the bottom base by the plurality of wheel-attachment features.

15. The modularly-wheeled cooler as claimed in claim 12 comprising:

a second plurality of peg-attachment features;

the second plurality of peg-attachment features being positioned within the receptacle;

the second plurality of peg-attachment features being integrated into the lateral wall; and the second plurality of peg-attachment features being distributed across the lateral wall.

16. The modularly-wheeled cooler as claimed in claim 12 comprising:

a telescopic handle;

the telescopic handle comprising a fixed end and a grasping end;

the fixed end being positioned external to the receptacle;

the fixed end being mounted onto the lateral wall; and the fixed end being hingedly connected onto the lateral wall.

17. The modularly-wheeled cooler as claimed in claim 12 comprising:

a first side handle;

a second side handle;

the first side handle and the second side handle being positioned external to the receptacle;

the first side handle and the second side handle being mounted onto the lateral wall; and the first side handle and the second side handle being positioned opposite to each other about the lateral wall.

18. The modularly-wheeled cooler as claimed in claim 12 comprising:

the lid being hingedly connected to the receptacle.

* * * * *